United States Patent [19]

Schaphorst et al.

[11] Patent Number: 4,729,020

[45] Date of Patent: Mar. 1, 1988

[54] SYSTEM FOR FORMATTING DIGITAL SIGNALS TO BE TRANSMITTED

[75] Inventors: Richard A. Schaphorst, Jenkintown; Neil Randall, Ft. Washington, both of Pa.

[73] Assignee: Delta Information Systems, Horsham, Pa.

[21] Appl. No.: 56,042

[22] Filed: Jun. 1, 1987

[51] Int. Cl.⁴ .............................................. H04N 7/13
[52] U.S. Cl. .................................... 358/133; 358/140; 375/31
[58] Field of Search ............... 358/133, 135, 136, 138, 358/140; 375/31

[56] References Cited

U.S. PATENT DOCUMENTS

| | | | |
|---|---|---|---|
| 4,394,774 | 7/1983 | Widergren | 375/31 |
| 4,454,593 | 6/1984 | Fleming | 364/900 |
| 4,517,596 | 5/1985 | Suzuki | 358/133 |
| 4,654,695 | 3/1987 | Fling | 358/140 |
| 4,694,336 | 9/1987 | Keesen | 358/133 |

Primary Examiner—Howard W. Britton
Attorney, Agent, or Firm—Z. T. Wobensmith, III

[57] ABSTRACT

In a preferred embodiment, a computer is employed to control the system. The system initially accepts analog signals and converts them into digital signals, which are then compressed, at a DPCM encoder, into a three bit code. Thereafter the once compressed signals are further compressed in accordance with a variable length code. The twice compressed digital signals are transmitted through formatter circuitry whereat a tag is added to indicate (in addition to other information) what forms of compression have been employed on the digital signals which follow the tag. The twice compressed and tagged digital signals are forwarded to a buffer storage device. The role of the buffer storage is to keep a relatively constant supply of data signals so that there is a relatively constant supply of pels moving to the transmitter at a constant frequency. The computer monitors the buffer fullness and the rate at which it is being loaded or is emptying. In response to such monitoring the system compresses more lines of digitized video or compresses less lines of digitized video. Additional compression can be effected by horizontal subsampling or by changing the first DPCM coding operation from a three bit code to a two bit code. The present system also includes a decoding loop which accepts the compressed and tagged digital signals. The compressed signals are initially synchronized in response to the tags so that the compressed signals are properly advanced into the stages of the decoding loop. The compressed signals are then decompressed (decoded) in accordance with the information carried by the tag. Thereafter the expanded digital signals are converted into analog signals for display on a video screen.

12 Claims, 11 Drawing Figures

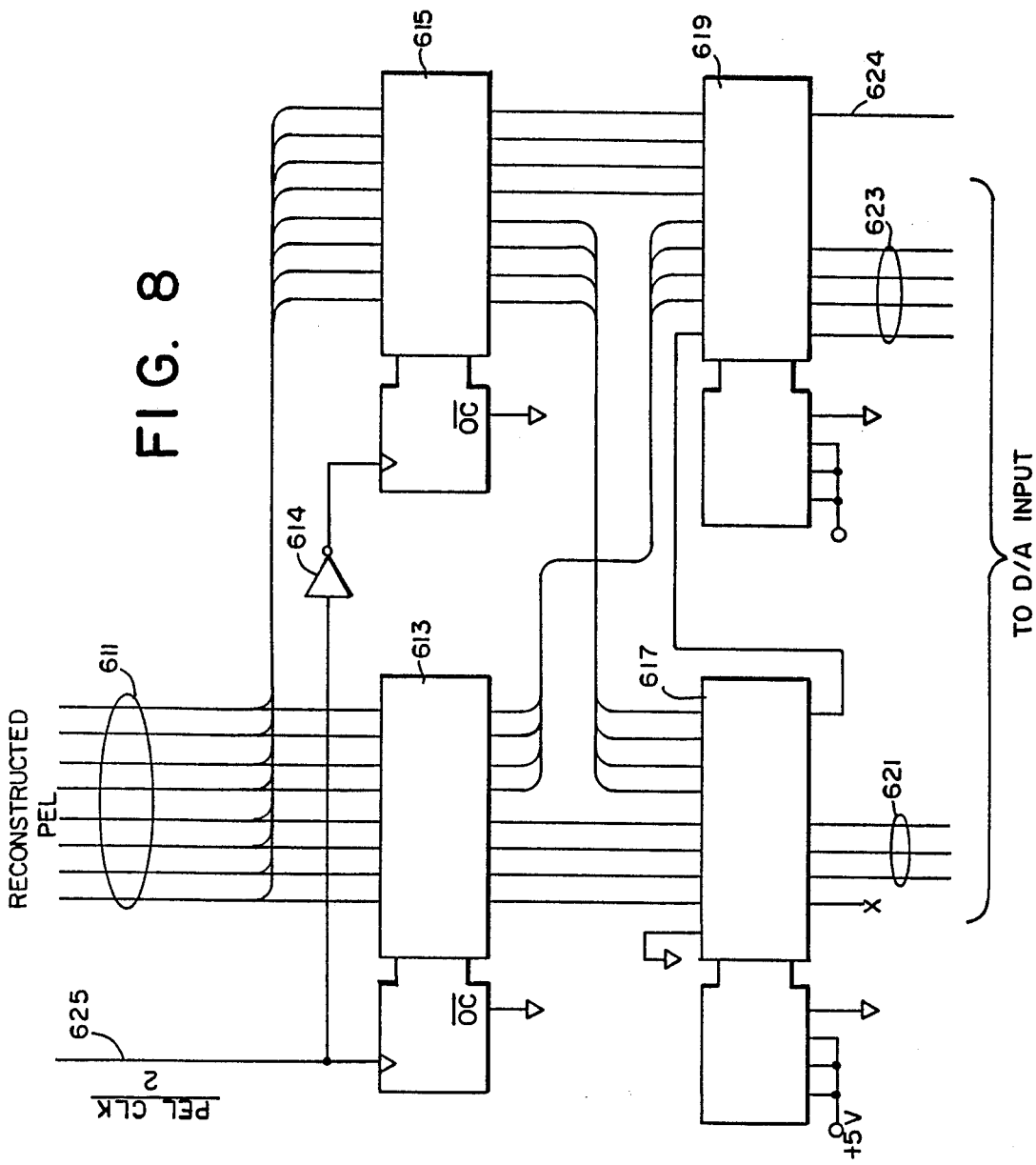

SYSTEM FOR FORMATTING DIGITAL SIGNALS TO BE TRANSMITTED

BACKGROUND OF THE INVENTION

At the present time most TV telemetry signals are transmitted in the clear over conventional analog TV channels. However, because more and more the transmission of TV signals involves the sending of corporate proprietary information, paid television programs and the like, there is a developing demand for encrypted transmission. It is well understood that encryption of analog signals is not satisfactory and accordingly attention has been directed to transmitting encrypted digital signals. Encryption requires the use of an encoder at the transmitter to convert the input video to a digital format and a decoder at the receiver to convert the received digital signals back to the analog TV format. The bit rate at the output of an encoder varies depending upon the application and can be anywhere in the range of from 5 to 40 mbps. At the present state of the art, encryption would limit the upper transmission rate to 10 mbps, however encoded signals per se can be sent at 40 mbps. The present system is directed to formatting the video into digital signals for optimizing the resolution of the output picture. Encryption may be added to the encoded signal train if desired.

If the TV input signal were to be encoded using conventional PCM, the transmitted bit rate would be in the range of 60 to 80 mbps. To achieve the permissible transmission bit rates (5 to 40 mbps), data compression techniques must be employed which reduce the redundancy inherent in the input picture. The objective of the present system is to compress and expand the TV signal within the required bit rate while maximizing the quality of the output picture.

SUMMARY OF THE INVENTION

The present system provides circuitry to flexibly vary the compression technique involved so that the compressed signals which are transmitted are only subjected to severe compression when the part of the picture being scanned (and therefore reproduced at the display screen) is a very busy image, i.e. fast excursions between black and white. The present system employs an 8-bit code when the analog signal (TV signal) is converted from an analog form to a digital form. As is well understood, the 8-bits represent 256 shades of gray. It is apparent that if each pel has 8 bits to define its shade of gray, then the bandwidth required must accommodate 8 times the number of pels, i.e. 640 pels per line in the preferred embodiment. Hence a bandwidth of 60 to 80 mbps is required. Since the band width is limited to 5 to 40 mbps because of the inability of a transmitter (which would be used within economic constraints of the application), to handle bandwidths in excess of 40 mbps, the number of transmitted bits must be reduced. However, a reduction of transmitted bits reduces the resolution of the output picture. Hence it is desirable to have as many transmitted bits as possible.

The present system includes a data processor for monitoring the rate of pixels being transmitted and reacts to that rate to either increase the compression or lessen the compression to maintain a constant pixel transmission rate and to hence maximize the resolution of the output picture. The data processor is connected (for control signal purposes) to a train of circuitry devices. The first device in the train is a DPCM encoder whereat the 8-bits coming from the analog to digital converter are converted into either a 3-bit code or a 2-bit code depending upon the decision of the data processor. Signals leaving the DPCM encoder are transmitted to a variable length encoder device, whereat the DPCM coded digital signals are further compressed in accordance with a variable length code. The computer keeps an account of what it has directed the system to do so that when the twice compressed digital signals leave the variable length encoder they are forwarded to a formatter whereat an information bearing tag is inserted to precede a train of twice compressed digital signals. The tag bears information which indicates (among other things) what kind of compression techniques have been applied to the train of digital signals following that tag.

The twice compressed and once tagged train of signals is transmitted to a buffer storage device. The buffer storage device keeps an account of the address where incoming signals are written and the address from whence the last signals leaving the buffer are read. This account is analyzed once per field. The difference between those two addresses provides information to the data processor so that the data processor can calculate the fullness of the buffer and the rate at which it is either being loaded or emptied. When the data processor detects that the rate at which the buffer is being loaded is excessive, it causes the system to more severely compress the data signals and when the data processor detects that the buffer load is emptying at an excessive rate it causes the system to perform less compression of data signals.

The signals leave the buffer storage and go to a communication interface from whence they are transmitted over coaxial cables to a transmitter. The signals are transmitted thereafter from microwave tower systems or satellites or any other communication link.

The present system as mentioned earlier also includes a decoder loop. In the decoder loop the compressed and tagged digital signals are received at a communication interface and transmitted therefrom to a buffer device. In the train being received there is a sync signal and that signal is transmitted to a timing device so that an incoming train of signals will alert the timing device which will in turn sync the other elements of the loop. The twice compressed (or possibly thrice compressed) digital signals from the buffer are transmitted to a sync detector. The detector picks up a sync signal from the tag and transmits it to the timing device to be certain that the signals leaving the buffer and passing through the sync detector are in fact in synchronization to be received by the next stage which is a decoder device. Thereafter the decoder decodes the following train of signals in a reverse variable length sense so that the signals are in a form of either a 3-bit code or 2-bit code. The next step in the decoder is to convert the 3-bit code (or the 2-bit code) into an 8-bit code. In the decoder device the signals are interpolated if, in fact, the tag indicates that the signal train following the tag has been subjected to horizontal subsampling. The interpolation involves averaging the values of two adjacent pixels and inserting a pixel value between the two adjacent pixels, which is the average of the two adjacent pixels. Accordingly after interpolation the signals leaving the decoder are substantially the same as the 8-bit code which left the analog to digital converter of the encoder section. The signals are then transmitted to a digital to analog converter and are converted into analog signals for use by the display device.

The features and objects of the present invention will be better understood when considered in view of the following description taken in conjunction with the drawings wherein:

FIG. 8 depicts the circuitry of the interpolator;

Figure 1:
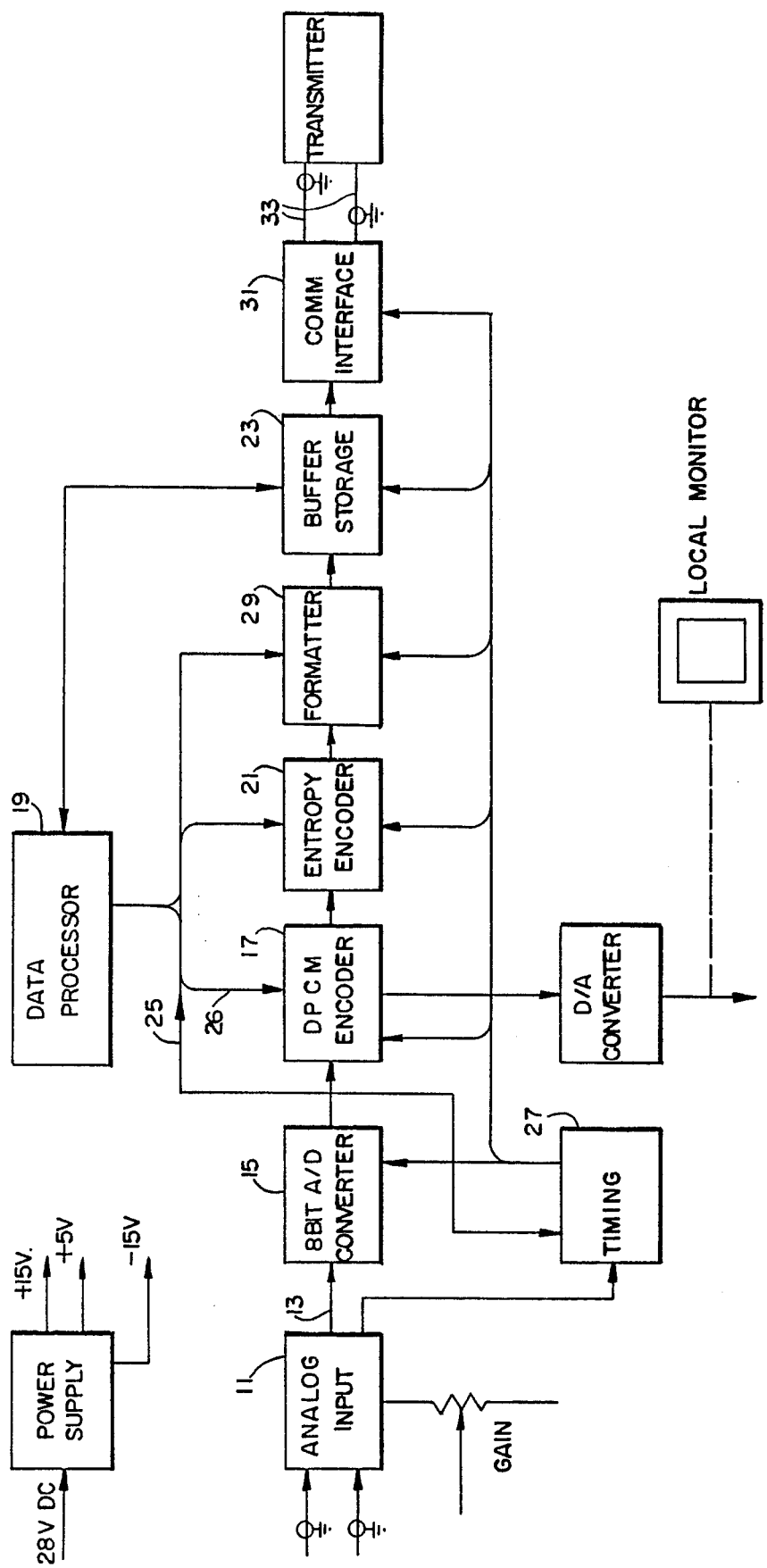
FIG. 1 is a block diagram of the encoder structure.

Consider FIG. 1. In FIG. 1 there is shown an analog input device which receives video signals from a video camera or from other sources. The analog input device 11 is shown in detail in FIG. 7 and will be discussed below. With respect to FIG. 1 it suffices to understand that the analog device 11 provides analog signals having a constant range of voltage values.

The analog signals are transmitted on line 13 to the 8-bit analog to digital converter 15. In a preferred embodiment the analog to digital converter is a Flash Converter similar to those manufactured by TRW Corporation. While in a preferred embodiment the analog signal is converted into a code of 8 bits for each pixel, it should be understood that other numbers of coded signals could be employed. The 8-bit signal used in the present system represents 256 shades of gray which in the preferred embodiment is sufficient to represent all shades of gray in the output picture. It is conceivable that lesser numbers of shades of gray could be considered and hence a smaller number of bits could be employed for each pixel. It should be understood that initially each pixel is represented by a group of 8-bits. The code, whether it be 8 bits or 3 bits or 2 bits or 1 bit, which represents a pixel shall in this description be referred to as a pel. The pels are transmitted serially to the DPCM encoder 17. The DPCM encoder 17 is shown in detail in FIG. 3 but it should be understood that devices different from that shown in FIG. 3 may be used to transform 8-bit signals into either a 3-bit code or a 2-bit code. At the DPCM encoder 17, the 8 bits are converted into a 3 bit or 2 bit differential code depending upon the nature of the control signals from the data processor 19. As will be better understood from later sections of the description, the data processor device monitors the available space in the buffer storage device as well as the rate at which the buffer is being loaded or emptied. When required the data processor in turn sends control signals, to the DPCM encoder, which cause the DPCM encoder 17 to encode the 8-bit pel into 2-bit pels rather than 3 bit pels. The control concept will be better understood in view of the discussion of the algorithm used in the preferred embodiment.

The next step in the encoding chain involves having the DPCM coded signals transmitted from the DPCM encoder 17 to the entropy encoder 21. In a preferred embodiment the entropy encoder acts to further compress the 2-bit pel, or 3-bit pel, representing pixels coming from the DPCM encoder, in accordance with a variable length coding technique. By way of appreciation of the amount of compression involved it is conceivable that a pixel which started out from the analog to digital converter as an 8-bit pel will leave the entropy encoder as a 1-bit pel.

As mentioned above, the data processor device can cause the compression rate to vary in accordance with the available space in the buffer storage device 23 and the rate at which the buffer is either being loaded or being emptied. If the system is scanning a busy section of a picture and the number of bits emanating from the entropy encoder 21 is at a rate which is causing the available storage space to be reduced at a rate which is excessively high, then the recognition (of the load condition and the rate of loading the storage space) by the data processor (in accordance with the algorithms stored therein) causes the system to do a horizontal subsampling routine by way of further compression. In the preferred embodiment this is effected by having the data processor transmit a signal over line 26 to the DPCM encoder 17. The DPCM encoder 17 then responds by advancing only every other pel which it receives from the analog to digital converter 15. It should be understood that the data processor provides an account as each line of pels is processed and provides information which indicates which line has been subjected to horizontal subsampling. The accounting further provides information as to how each pixel line has been compressed i.e. either to a 3-bit, or a 2-bit, code and whether or not each line of pels has been subjected to the variable length code technique. The data processor formulates the compression information into a tag which is a set of bits and which tag is transmitted to the formatter 29. In the formatter 29 the tag is inserted ahead of a group of bits at the beginning of each line of video information. Each line of video information with its associated tag becomes stored in the buffer storage device 23. The compressed and tagged lines of pels are transmitted through the communication interface 31 along the coaxial cables 33 to the transmitter station. It should be understood that the signals could be transmitted from the transmitter by a microwave tower system or by satellite or any other communication link.

Figure 2:
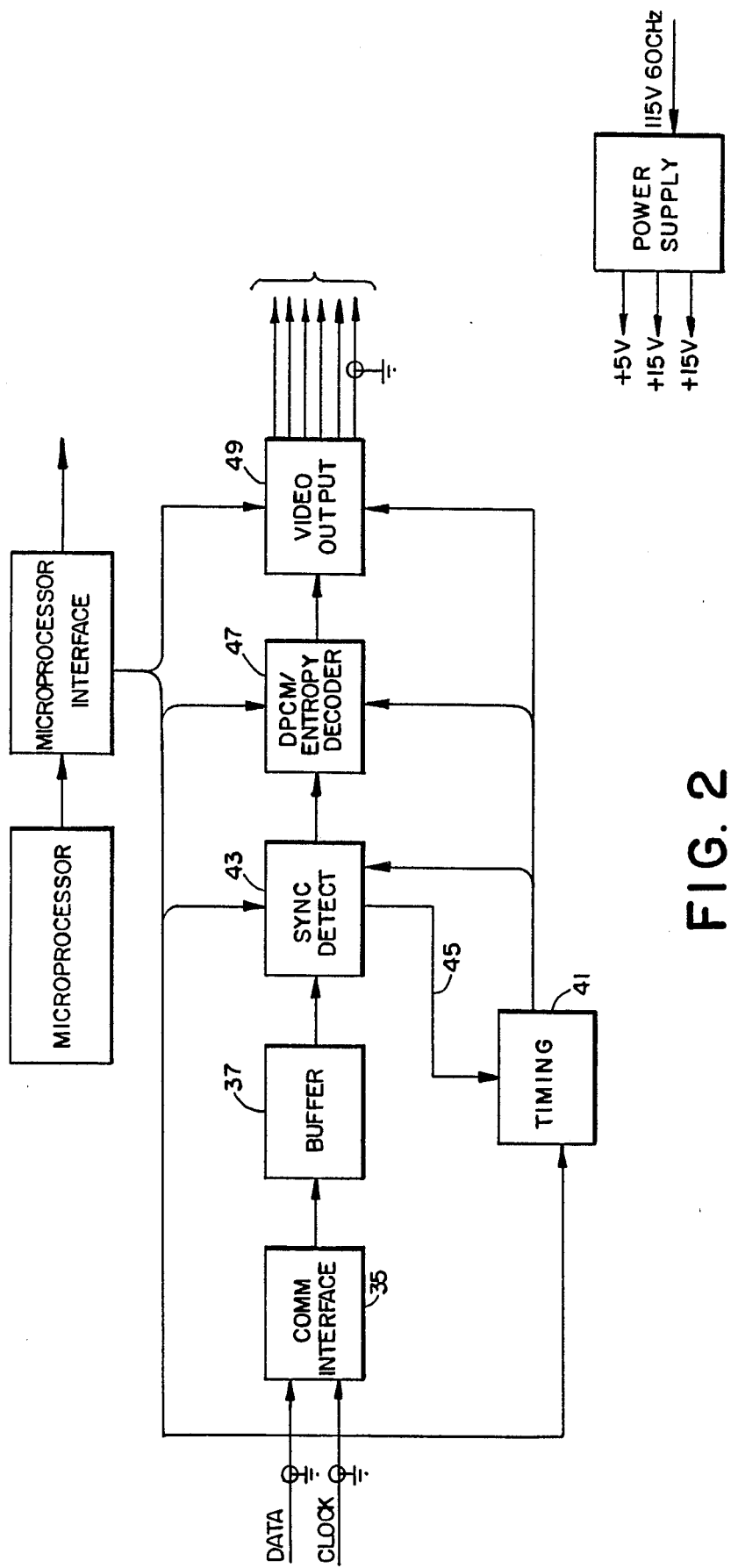
FIG. 2 is a block diagram of the decoder structure.
Figure 10:
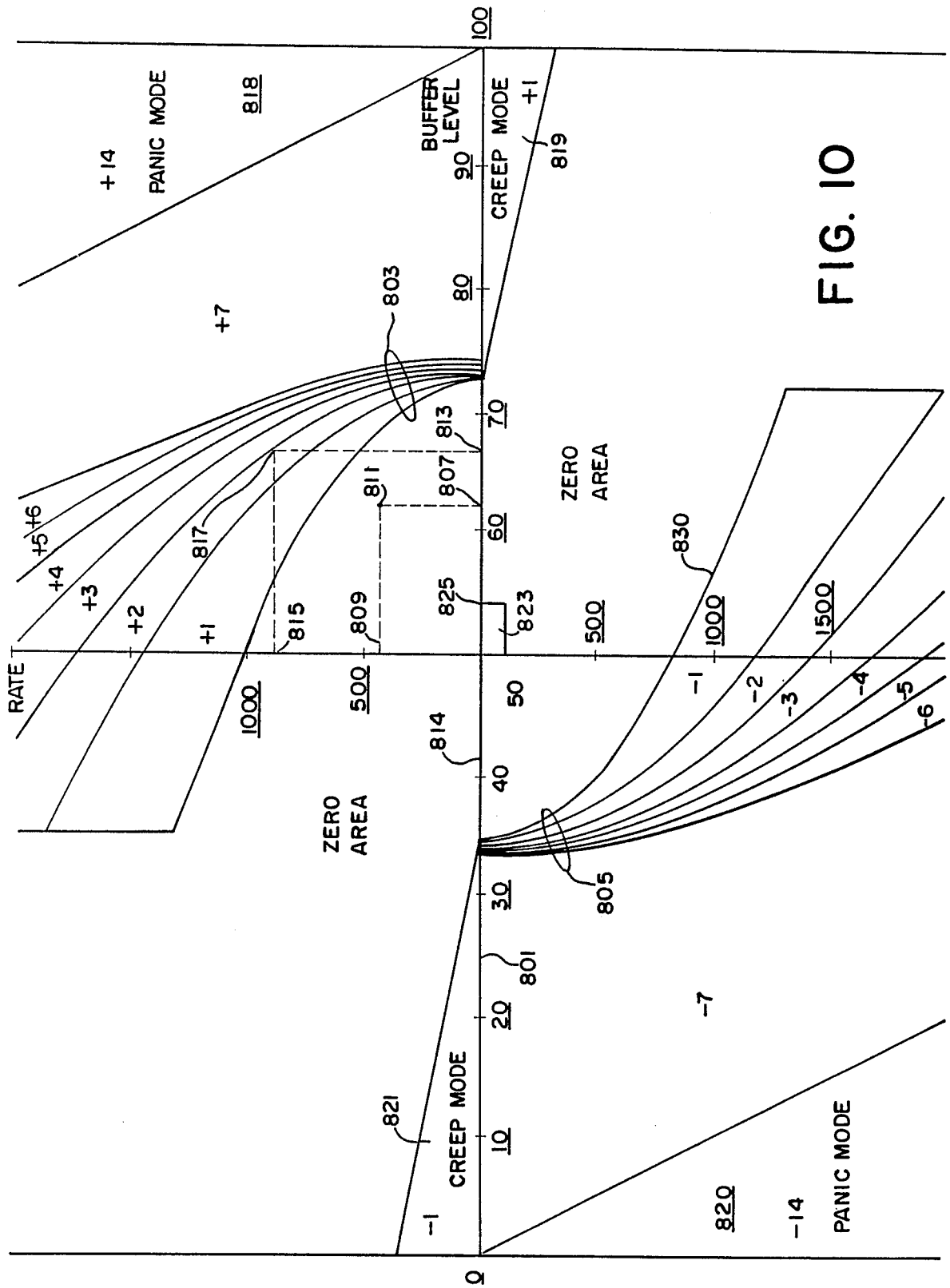
FIG. 10 is a graphic analysis of the algorithm used in the preferred embodiment.

Before studying FIG. 2, let us consider the algorithm which is employed in the preferred embodiment and which is graphically depicted in FIG. 10. Other specific algorithms (than the one shown in FIG. 10) could be used with the present system. FIG. 10 depicts graphically the philosophy of the algorithm used in the preferred embodiment of the present invention. In FIG. 10 there is shown a horizontal line 801. The positions along the line 801 represent the degrees to which the buffer is loaded at the end of any given field. It will be recalled that the data processor subtracts the last read address in the buffer (from whence information signals were read) from the last write address in the buffer (i.e. the address into which information signals were written). The difference represents the degree to which the buffer is loaded with data signals. Note that the cross marks on line 801 are marked 10, 20, etc. up to 100 which means, of course, 10%, 20%, etc. up to 100%. The positions along the vertical upward line represents the rate of loading the buffer per field while the positions along the vertical downward line represents the rate of emptying. The system designer can use whatever rate accommodates the buffer of the system. In our example we are choosing to have each hash mark represent 500 address positions and hence the hash marks 500, 1000, 1500 and 2000 become meaningful. The data processor 19 of the system determines the load level of the buffer at the end of a field (during the vertical blank time) and compares that load level value with the previous load level value. The difference, of course, represents the rate at which the buffer is being loaded (or being emptied). As was mentioned and as will become more apparent the lower half of the graph depicts a negative rate of loading, or emptying, of the buffer. The correction lines 803 and 805 serve to define areas which result from consideration of the buffer level condition and the rate of loading, or emptying and those areas represent a change in video lines to be compressed. The present system operates to compress to a different degree a selected number of video lines rather than act upon an entire field. To explain that operation further, consider that the buffer level was at 62% loaded (hence that loaded condition is represented by point 807). Further assume that the data processor determines that the difference between the previous buffer level and the present buffer level indicates a positive loading rate of 412 positions. The foregoing loading rate would be depicted at point 809. Under the above described conditions, the data processor would determine the correction point should be point 811 and it can be seen in FIG. 10 that point 811 is in the zero area. The zero area means that the system will not change the current compression rate. Accordingly, the algorithm dictates that the system should not effect any more or less compression. In other words, the data is being fed from the buffer at a rate which is commensurate with the rate that information signals are being added to the buffer. If however the next frame is very busy so that at the end of the frame the buffer is loaded to 66% (and therefore would be at point 813 on the graph), and the rate of loading was a positive 900 positions during that frame (depicted on the graph at point 815) then the data processor would determine a correction rate of plus 2 (depicted at point 817 and lying in the plus 2 area). The data processor would then direct the system to compress two additional lines. In the foregoing hypothetical, the system may already be compressing ten lines and those lines are chosen to be widely dispersed throughout the frame to minimize any distortion resulting from compression. For instance, the ten lines could be lines 3, 25, 60, 88, 103, 128, 159, 177, 207 and 231. In our hypothesis the correction was plus two lines and hence the system would compress two more additional lines. The two additional lines would be chosen to be widely dispersed as an addition to those already being compressed. The selection of the lines to be dispersed throughout the frames is accomplished by a lookup table which is well understood in data processing art.

If the system is now compressing twelve lines as just described and there is no correction point determined outside of the zero correction area at the end of the next field, then the system will continue with twelve lines of compression. It is apparent from the graph of FIG. 10 that if the buffer load level exceeds 75% that the loading rate is of diminished significance because the correction points are in the plus 7 area for all of the loading rates. Accordingly a dramatic increase in compression will be experienced under those circumstances. It is also apparent from FIG. 10 that if the buffer level exceeds 95%, the correction points are apt to be in the "panic area" and a large number of video lines (14 video lines in the preferred embodiment) will be added to the number of lines to be compressed. If all 240 lines of the field are being compressed, for instance, by the entropy encoder then the system will (using the same algorithm) direct the DCPM encoder 17 to effect horizontal subsampling on selected lines. In a similar manner if horizontal subsampling is applied to all 240 lines of a field then the system will next effect a DPCM encoding procedure of converting the 8 bit code into a 2 bit code.

If we again examine FIG. 10 and in particular the portion thereof which represents the negative correction, or emptying, factors, we note that there is a zero area as well as −1 through −7 areas which very closely resemble (in a mirror image concept), the areas which we have just considered above line 801. It should be noted that the initiation points of the lines 805 are at the 35% mark while the initiating positions of lines 803 are at the 75% mark. In short, the initiating positions of the lines 803 and 805 are not symmetrically located. The foregoing arrangement is in effect because, during the vertical blanking time, information is still being removed from the buffer while during that time there is no information being added to the buffer. Accordingly there is always a emptying mode in operation so that the algorithm has more concern about the emptying condition than it does about the loading condition. Also note that line 830 which separates the zero area from the −1 area crosses the rate line somewhere between the 500 position and the 1000 position so that if the rate of emptying for instance were 800 units and the buffer level were anything less than 50% filled then the correction point would lie in the −1 area and one less line would be compressed during the upcoming field than would have taken place during the previous field. The system operates in reverse from that described earlier in the sense that if the loading rate is negative, the lookup table acts to remove the last line added to the compression group and the last six or seven lines if in fact the correction value should happen to be in the −6 or −7 areas. It should also be noted in FIG. 10 that there is a panic area related to the emptying rate if the load level is dramatically low. In the preferred embodiment the panic rate is a removal of 14 lines.

As can be seen in FIG. 10 there is a creep area on both the right hand and left hand sides of the graph. The creep area 819 is designed to cause the system to add an additional line to be compressed, even though the loading rate is negative (i.e. the buffer is emptying). To explain further (and by way of example) if the buffer level and the rate of loading are such as to put the correction factor in the +7 area then the compression of 7 additional lines might very well create a negative loading rate and hence put the correction activity below line 801. However, the system is designed such that philosophically it is concerned with keeping the buffer from approaching a full load because a sudden change in the picture (i.e. a change to a very busy picture) could overload the buffer. Even though the buffer is emptying, if the buffer is near full load the system acts to add another line of compression. For instance, if the coordinates of the graph of FIG. 10 place the load factor and the rate of loading in the creep area 819. Another line of compression will be added. Accordingly the algorithm operates so that there is a continuation of compression for each field as long as the correction factor is in the creep area 819. The reverse is true for creep area 821. For instance if the correction factor were to lie in area 821, the system would remove a video line from being compressed for each field as long as the correction factor continued to lie in creep area 821.

It should also be noted that FIG. 10 shows a block 823. It can be assumed that the system is always effecting some form of compression. Very often when the system is operating in the zero area the buffer will be loaded to a certain point and the rate of loading will become negative because of the status of the activity in the picture, or because the system does not correct for fractions of video lines. Accordingly, the correction factor may fall below line 801 at some point in time and at some subsequent time the rate of loading and degree of loading will place the correction factor in the positive quadrants (i.e. above line 801). If the picture is somewhat consistent then the correction factor will cycle within the zero area.

When the system operates in that mode, very often, the same lines are compressed because of the lookup table mentioned earlier. Hence the viewer sees the same line or lines flickering, or suffering the same repeated distortion and such a situation can be undesirable. The algorithm provides that if the correction factor falls into area 823, the system will act to add fill (i.e. a series of 1's ). Hence the cycle will be reduced because even though the system is continuing to compress there will be fill added and the excursion between the correction factors becomes reduced.

The foregoing discussion related to the algorithm used in the preferred embodiment has been related to the graph shown in FIG. 10. It should be understood that philosophically the procedures or algorithm can be implemented in a number of different ways programwise all of which are apparent to those skilled in the art and accordingly flowcharts to show such an algorithm are deemed to be unnecessary.

Consider FIG. 2 which shows a block diagram of the decoder loop. In FIG. 2 there is shown a communication interface 35. The communicatio interface 35 and the communication interface 31 are each comprised of a driver which drives the transmission lines at the proper impedances. Twice compressed and tagged signals emanate from the communication interface 35 and are transmitted to the buffer 37.

The compressed and tagged pels leave the buffer 37 and are transmitted to the sync detector device 43. A tag signal provides a start of line signal on line 45 to the timing generator 41. The signal on line 45 informs the clock pulse generator 41 that the following data is formed into a tag portion and a data portion.

The DPCM entropy decoder 47 is composed of two decoding stages, as will be explained in more detail in conjunction with FIGS. 3 and 4. When the signals leave the sync detector they are decoded from the variable length code into a 3-bit code or 2-bit code configuration. The signals are then subjected to a reverse DPCM decoding technique so that the signals are reconverted to an 8-bit representation of each pixel. If there has been no subsampling the train of 8 bit pels at that time will be substantially the same as the train of 8-bit pels which left the converter 15 on the encoder side. If subsampling has taken place then the train of 8 bit pels needs interpolation. This train of 8-bit pels is then transmitted into the video output means whereat it is converted into analog signals and forwarded to the monitor.

Figure 3:
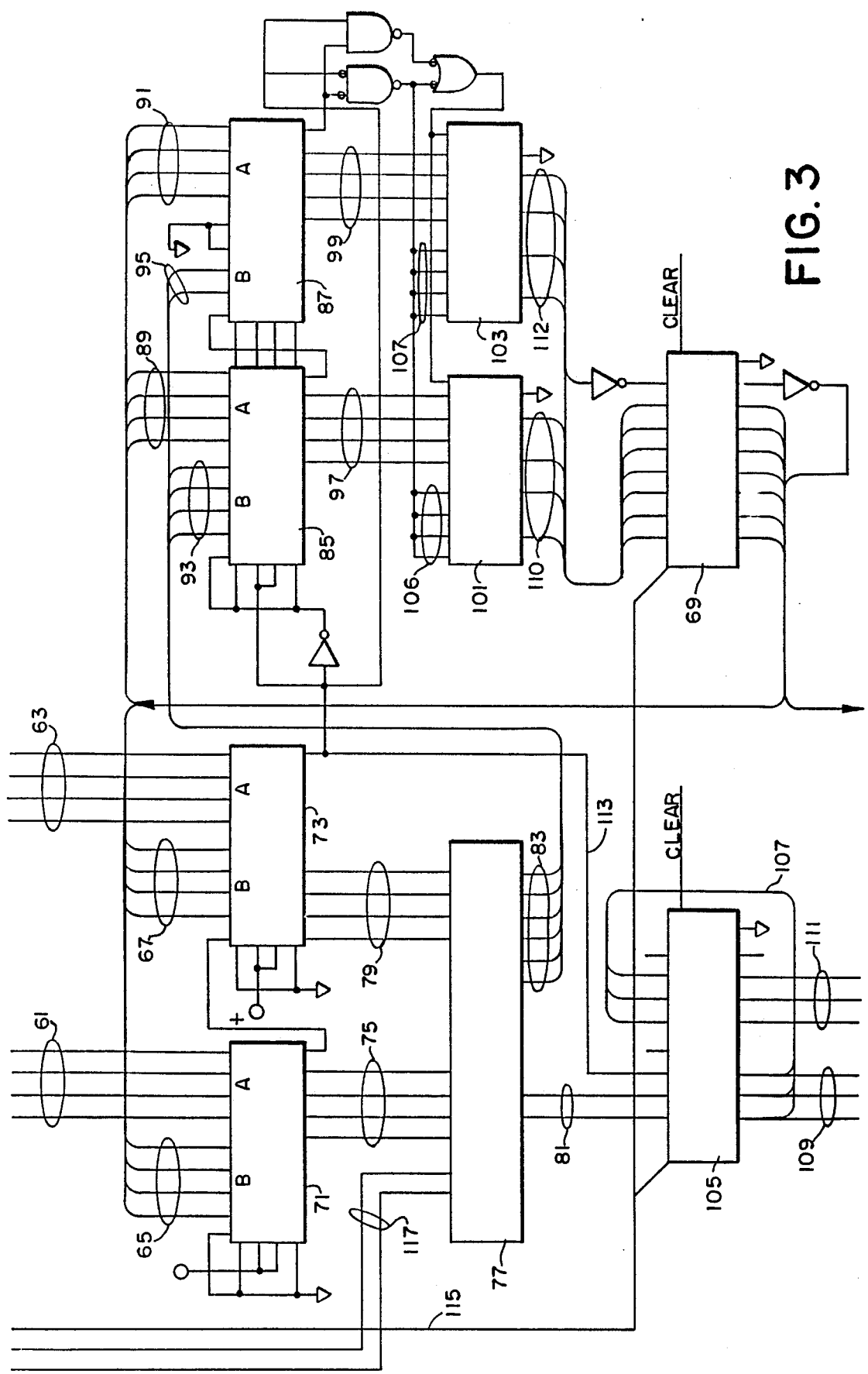
FIG. 3 is a block-schematic diagram of the structure of the DPCM encoder.
Figure 4:
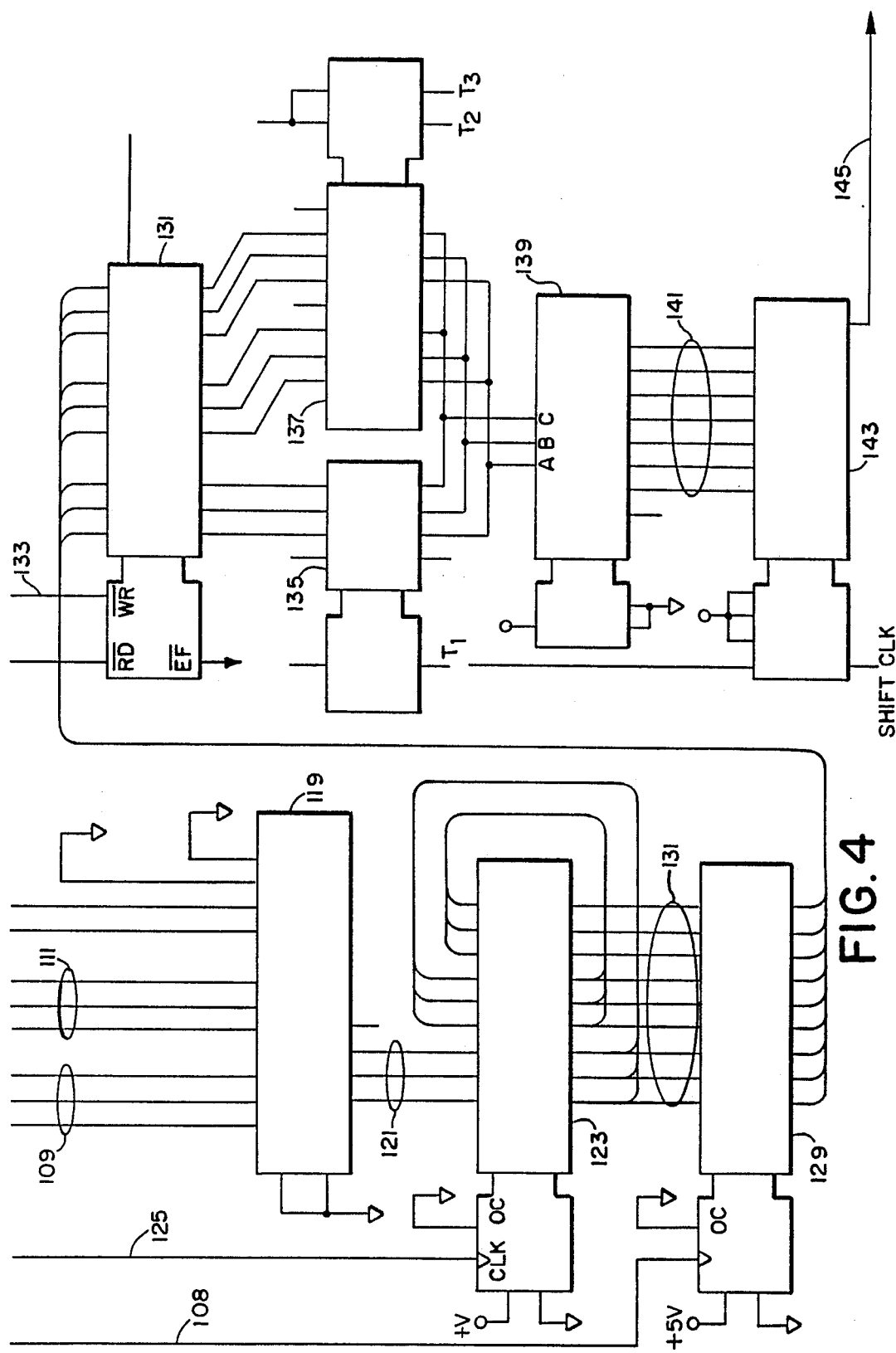
FIG. 4 is a block-schematic diagram of the entropy encoder.

FIG. 3 is a detailed diagram of the DPCM shown as encoder 17 in FIG. 1. The DPCM encoder acts to forward only the difference value or the error value between two adjacent 8-bit pels which are being compressed into a 3-bit code. This form of compression is accomplished by the circuitry of FIG. 3. In FIG. 3 there are shown four lines 61 and four lines 63 which receive the 8-bits from the A to D converter 15 in FIG. 1. The low order bits are found on lines 61 while the high order bits are found on lines 63. The previous pel signal values are transmitted on the lines 65 and 67 from the latch 69. While the signals on lines 65 and 67 are not the actual previous pel values, for the moment assume that signals on line 65 and 67 represent the 8-bits of the previous pel. In the adder 71 the low order bits of the previous pel are subtracted from the low order bits of the current pel and in the adder 73 the high order bits of the previous pel are subtracted from the high order bits of the current pel. The difference signals or error signals are forwarded along the lines 75 and 79 to the prom 77. There is a lookup table formulated in the prom 77 so that when the 8-bit error code, which comes in on lines 75 and 79, is transmitted to the prom, that value produces a 3 bit differential coded set of output signals on the lines 81 and 83. It should be understood that signals on the previous pel lines 65 and 67 really do not represent the actual value of the previous pel signals coming from the A to D converter 15 but instead the previous pel signals on the lines 65 and 67 represent a continued adjustment or compromise of signals to reduce the error values on line 81. By way of example let us assume that the current pel had a value of 170. It should be recalled that the 8-bits coming from the A to D converter can represent 256 shades of gray so accordingly a pel could have a value of 170. And further assume that an adjusted previous pel on lines 65 and 67 had a value of 100, then the difference would be 70. However, the prom 77 in accordance with the algorithm for the system is arranged such that if there is a difference in excess of 32, the system will merely recognize it as 40. Hence the value of 40 is transmitted on line 83 and the code value of the signals on lines 81 will be 5.

For the moment we will consider the generation of the previous pel. The value of 40 will be applied to lines 83 and those signals will be forwarded to the adders 85 and 87. Now it will be recalled that the previous pel with which we dealt on lines 65 and 67 had a value of 100 and that same value is transmitted onto the line 89 and 91. In the adder 85 "A" will be added to "B". In this case the value at the lines 93 and 95 would be equal to 40 while the values at lines 89 and 91 would be 100. Accordingly the values at 93 and 95 are added to the values of 89 and 91 and the output has the value of 140 and is transmitted on lines 97 and 99. The value on lines 97 and 99 is sent to the limiter devices 101 and 103 whereat they are compared with a standard value at 256 or 0. The value on lines 97 and 99 cannot exceed 256 (or be less than zero) which is the total number of shades that the system can accommodate. The other inputs to the limiter devices 101 and 103, on lines 106 and 107, are present for the following reasons. If the total exceeds the range of zero to 256, then either 256 or zero is selected by the mux to be loaded into the latch 69. In our particular example a value of 140 would be passed on the lines 110 and 112 and that value would be transmitted to the latch 69. It will be recalled that the previous pel values came from the latch 69. After this one interation the value of 140 becomes the previous pel value and is transmitted back to the lines 65 and 67 to be compared with the next current pel. Now if the next current pel indeed had the same value of 170, which is highly likely, then the difference between the "previous pel" and the current tell is 30 and accordingly the error signal is reduced and the coded difference on lines 81 is also reduced. The circuitry functions as described and the difference values above are constantly compromised and the error values are kept small so that a 3-bit code can represent an 8-bit value and yet only necessitate 3-bits. The 3-bit output signals from the prom 77 on lines 81 are transmitted to the shift register 105. The output from the shift register 105 is returned back into the shift register along the lines 107. Hence at any given time there are two pels stored in the shift register 105. The 3-bit coded pels in the shift register 105 are ready for transmission on the lines 109 and 111 to the entropy encoder. It will be noted that the third bit joining the 2-bits on line 81 is provided on the sign bit line 113. The bit on the sign bit line is called a sign bit because it indicates whether the error is positive or negative. The information in the shift register 105 as well as the information in the latch 69 is clocked therefrom in response to a pel clock signal on line 115. The signals on lines 117 represent the control signals to distinguish between a 3 bit code and a 2 bit code.

As was described with respect to FIG. 1 the 3-bit pel is forwarded from the DPCM encoder to the entropy coder 21. FIG. 4 is a detailed diagram of the entropy encoder along with a FIFO which is part thereof. Each time that the pel clock signal from FIG. 3 is generated the 3-bit coded pels in the shift register 105 are advanced on the lines 109 and 111 of FIG. 4. Those last mentioned lines are the same as in FIG. 3. Accordingly two sets of pel signals are forwarded to the predictor device 119 in FIG. 4. The predictor device 119 is a prom and is loaded according to an algorithm which predicts from empirical information that if two adjacent pels have any particular two values then the next pel thereafter will have a certain value. Accordingly two adjacent pel values are transmitted to the predictor 119 and this causes a readout of a predicted pel 3-bit value on lines 121. The algorithm which determines the output of the predictor is a variable length code algorithm and is well understood in the art. The signals on line 121 are passed to the shift register 123 in response to shift signals on line 125. Three predicted pels are held in the shift register 123 at any given time. For every three shift pulses there is a buffer clock pulse on line 108 and that pulse causes the latch 129 to accept three 3-bit pels thereinto from the lines 131. The basic reason for shifting three 3-bit pel signals at one time is to accommodate the FIFO 131. The FIFO 131 does not operate as fast as the system heretofore described but can operate at something greater than one-third of the speed of the before described structure. Accordingly the 3-bit pels are held in the buffer 129 to be accepted into the FIFO 131 in response to the write signals on line 133.

The output signals from the FIFO 131 are available to the latch devices 135 and 137. The latch devices 135 and 137 are sampled in rotation in response to the timing signals T-1, T-2 and T-3 and hence there are three bursts of 3-bit signals into the octal to binary converter 139. In the octal to binary converter 139 the 3-bit signals are transposed into binary signals but not binary coded signals. It can be gleaned from FIG. 4 that the output of the octal to binary decoder 139 involves seven lines and hence the greatest value that can be transmitted therefrom is the value of 7 which would be 1000000. It should be understood that the high orde value is at the left hand most side. In actual practice it has been determined that only on a relatively few occasions would the system encounter a value of 7 and in the majority of the cases the encountered value is either 10 or 100. In considering the values of 1, 10 or 100 the zeros precede the "1" in the time domain and for instance 1 equals 1, 10 equals 2 and 100 equals 3, etc. Only the zeros preceding the 1 as well as the 1 are forwarded from the shift register 143 along line 145 in serial fashion. Accordingly it becomes apparent that what started out as an 8-bit signal representing a shade of gray can be compressed into a signal having 1-bit, 2-bits or 3-bits, depending upon the extreme variations of grays and whites in adjacent positions pixel-wise.

Now it should be understood that 74AS181A's are employed as adders 71, 73, 85 and 87 and are commercially available and in the preferred embodiment are manufactured by Texas Instruments Corp., Signetics Corporation and Motorola Corporation. It should also be understood that the prom 77 in the preferred embodiment is manufactured by Texas Instruments, Hitachi and A.M.D. Corporation while the prom 119 in the preferred embodiment is manufactured by Texas instruments and Hitachi. It should also be understood that the shift register 105 as well as the latch 69 are 74AS874's manufacturered by Texas Instrument Co. The limiter device which is made up of two halves, 101 and 103, comprises two 74ALS157's manufactured by Texas Instrument Co. in the preferred embodiment. The multiplexer 135 and 137 each is a one half of a 74AS874 manufactured by Texas Instrument Co. The FIFO device 131 is a 7202 manufactured by Integrated Device Technology while both the latch 129 and the shift register 123 are 74AS821's manufactured by Texas Instruments Co. The octal to binary device 139 is a 74ALS138 manufactured by Texas Instruments Co. while the shift register 143 is a 54F323 manufactured by Texas Instruments Co.

Figure 5:
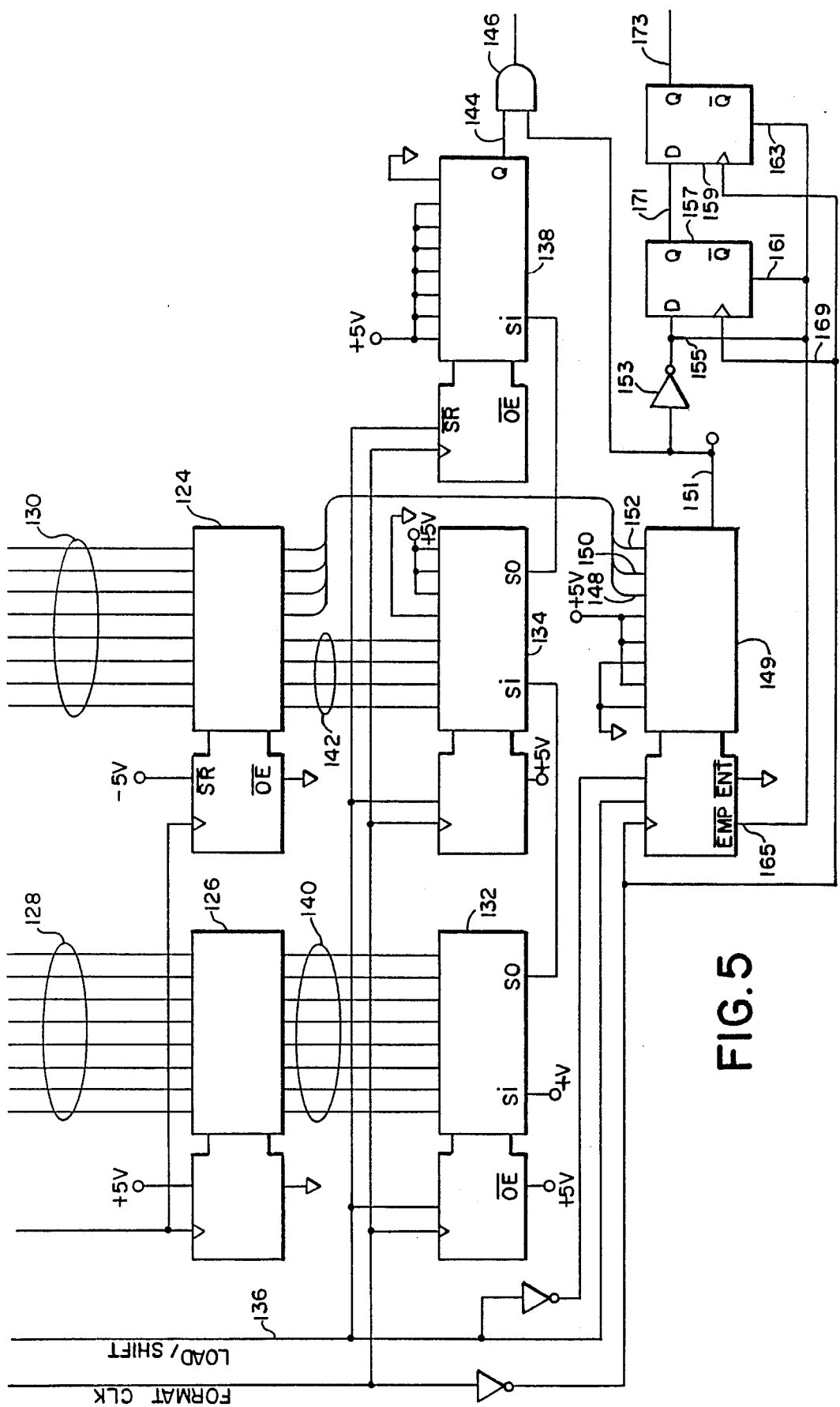
FIG. 5 is a block-schematic diagram of the formatter circuitry.

FIG. 5 is a schematic diagram of that portion of the formatter circuitry which generates the tag which precedes a string of digitized video data signals. In FIG. 5 there are shown two buffer registers 126 and 124. The lines 128 and 130 which are the input signals to the buffer registers 126 and 124 come from the microprocessor. The microprocessor sends a 16-bit signal to the buffer registers 126 and 124 and twelve of those bits represent information related to the compression techniques that are applied to a string of bit signals passing through the A to D converter 15, the DPCM encoder 17, and the entropy encoder 21 found in FIG. 1. As mentioned earlier, the microprocessor is programmed to provide an account of what techniques are applied to the string of data signals. The information transmitted from the microprocessor is transmitted from the buffer registers 126 and 124 to the shift registers 132 and 134. In response to a shift signal on line 136 the shift registers 132 and 134 shift the information serially therefrom to the shift register 138. It will be noted that there are ten high signals (i.e. high equals 5 volts) transmitted into the shift register 138 and two ground signals. It will also be noted that there are three high signals (5 volts) and one ground signal loaded into the shift register 134. Accordingly the first 12 bits that come from the shift register are 011111111110 which is a sync signal that syncs the transmission of words from the formatter 29 in FIG. 1. That 12-bit sync signal is followed by the 12-bits that were forwarded to the shift registers 132 and 134 on lines 140 and 142. Accordingly then the sync signal is followed by the compression information tag and that series of signals is transmitted serially on line 144 to the AND gate 146. The microprocessor also keeps an account as explained earlier of the amount of available space in the buffer register 23. Part of the algorithm with which the microprocessor operates includes steps which determine how rapidly the buffer storage device 23 is being emptied. If indeed the buffer storage 23 is being emptied at a rate which is in excess of a predetermined acceptable rate then the microprocessor will send a signal on one of the lines 148, 150 or 152. Normally the counter 149 is loaded to count to twenty four which takes care of the twenty four bits representing the sync signal and the compressed tag information. However, if the microprocessor determines that the buffer is being emptied at a rate in excess of the acceptable rate, then a control signal may be sent on line 148 which causes the system to load an additional 32 bits into the counter 149. A signal on line 150 would load an additional 64 bits while signal on line 152 would load an additional 128 bits.

It should be understood that the counter 149 decrements or counts down and while it is so counting there is a high signal at the output line 151 which provides a high signal to the AND gate 146. Therefore all the time that the counter is counting down, the twenty four bits representing the sync signal and the tag are transmitted through the AND gate 146, to the main channel of the information being forwarded whereat those signals are inserted prior to the video data. At the same time the high signal on line 151 is inverted at the inverter 153 and provides a low signal on line 155 which holds the flip flops 157 and 159 in a state of reset through the reset lines 161 and 163. Flip flops 157 and 159 are D latch type flip flops and respond to a negative signal to stay in the reset state. The negative signal on line 155 is also passed to the not enable signal on terminal 165. The not enable signal on terminal 165 keeps the counter 149 from counting. When the value of the counter 149 has been decremented to zero a negative signal is applied to line 151 which blocks the AND gate 146 and prevents any further signals coming on line 144 from passing through that gate. At the same time that negative signal is inverted at the inverter 153 and a positive signal is transmitted on line 155 and hence the flip flops 157 and 159 are no longer held in the reset stage. A positive signal is applied to the latch input in respons to the format clock signal on line 169, which causes the flip flop 157 to be transferred to its upper side. The output on line 171 from flip flop 157 provides an input to the D terminal of the flip flop 159 and therefore at the second format clock signal time the flip flop 159 is transferred to its upper side. The output signal on line 173 conditions an AND gate which permits the digitized video signals to proceed along the main channel and follow the tag.

Figure 6:
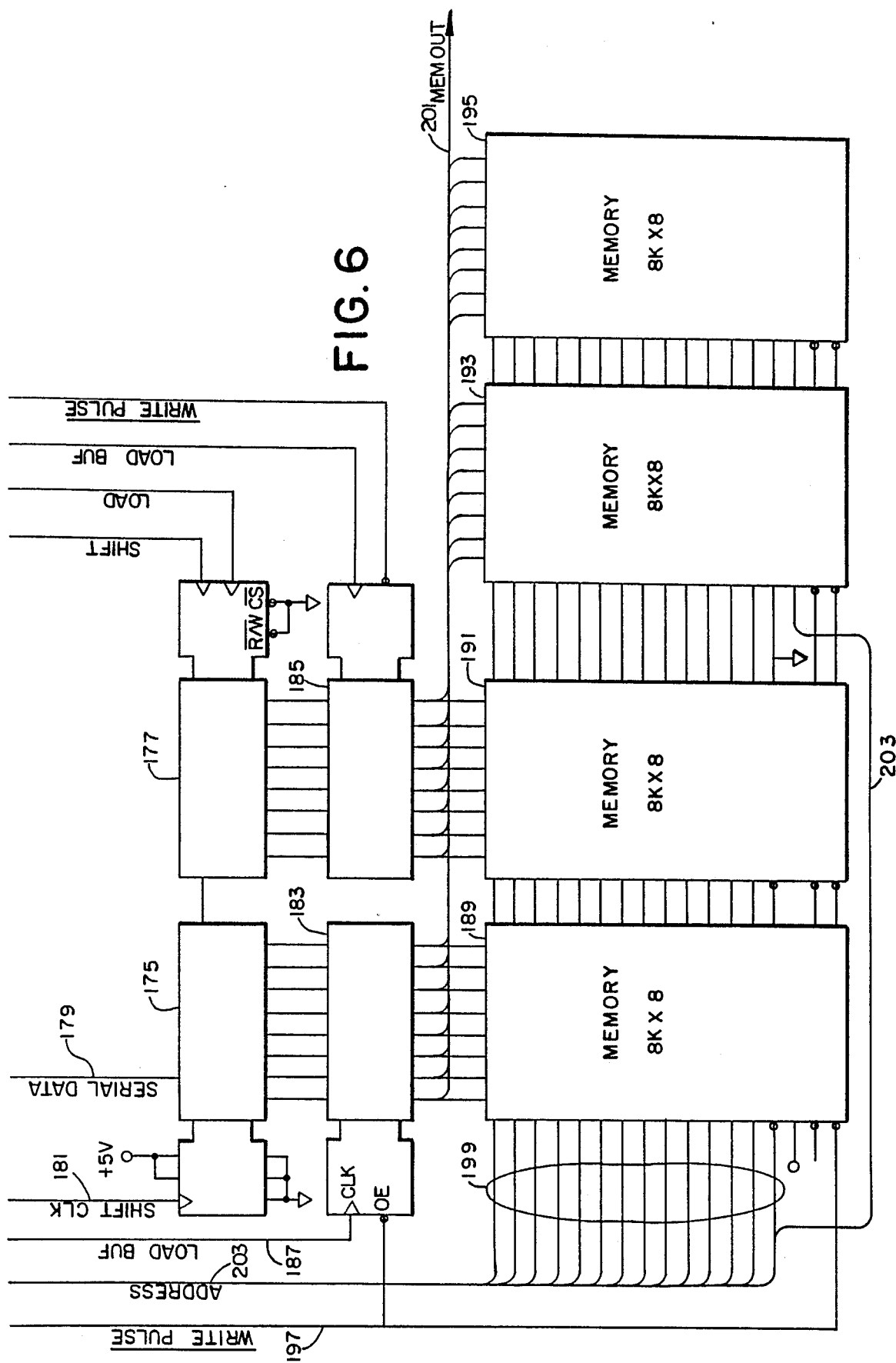
FIG. 6 is a block-schematic diagram of the buffer storage device.

Consider now FIG. 6 which depicts the buffer storage device described as buffer storage 23 in FIG. 1. The signals coming through the AND gate which was conditioned by the signal on line 173 in FIG. 5 arrive at the shift registers 175 and 177 by virtue of the input line 179. Signals are advanced in response to the shift clock signals on line 181. The signals in the shift registers 175 and 177 are transferred in parallel therefrom to the holding registers 183 and 185 in response to the load buffer clock signals on line 187. The signals are thereafter transferred from the registers 183 and 185 into the memory devices 189, 191, 193 and 195. As can be seen in FIG. 6, the signals from the register 183 are transferred to both the memory 189 and 193 while the signals in the register 185 are transferred to the memory 191 and 195. This system needs 16K by 8 bits of memory and therefore multiple memories are used and they are loaded one after the other. In other words when the memories 189 and 191 are loaded then the memories 193 and 195 are loaded. The system operates such that it is alternately in a write and read state. The "not write" signal on line 197 is transmitted to the "not write" enable terminals. Hence a set of address signals coming in on the lines 199 will cause the memory devices to have a read out. The read out provides signals on the lines 201 which is a 16 bit read out and those signals are the signals that are transferred to the communication interface 31 in FIG. 1. The memories are chosen between, for instance memory 189 and 193 by a signal on line 203 and it should be apparent that many additional memories can be used. It should be understood that the buffer acts as a device to keep the bit signals moving along the main channel at a constant rate. The address signals on line 203 and on line 199 appear at a regular clock time so that the analog signals to the display device are available at a fixed frequency.

Figures 7, 7A:
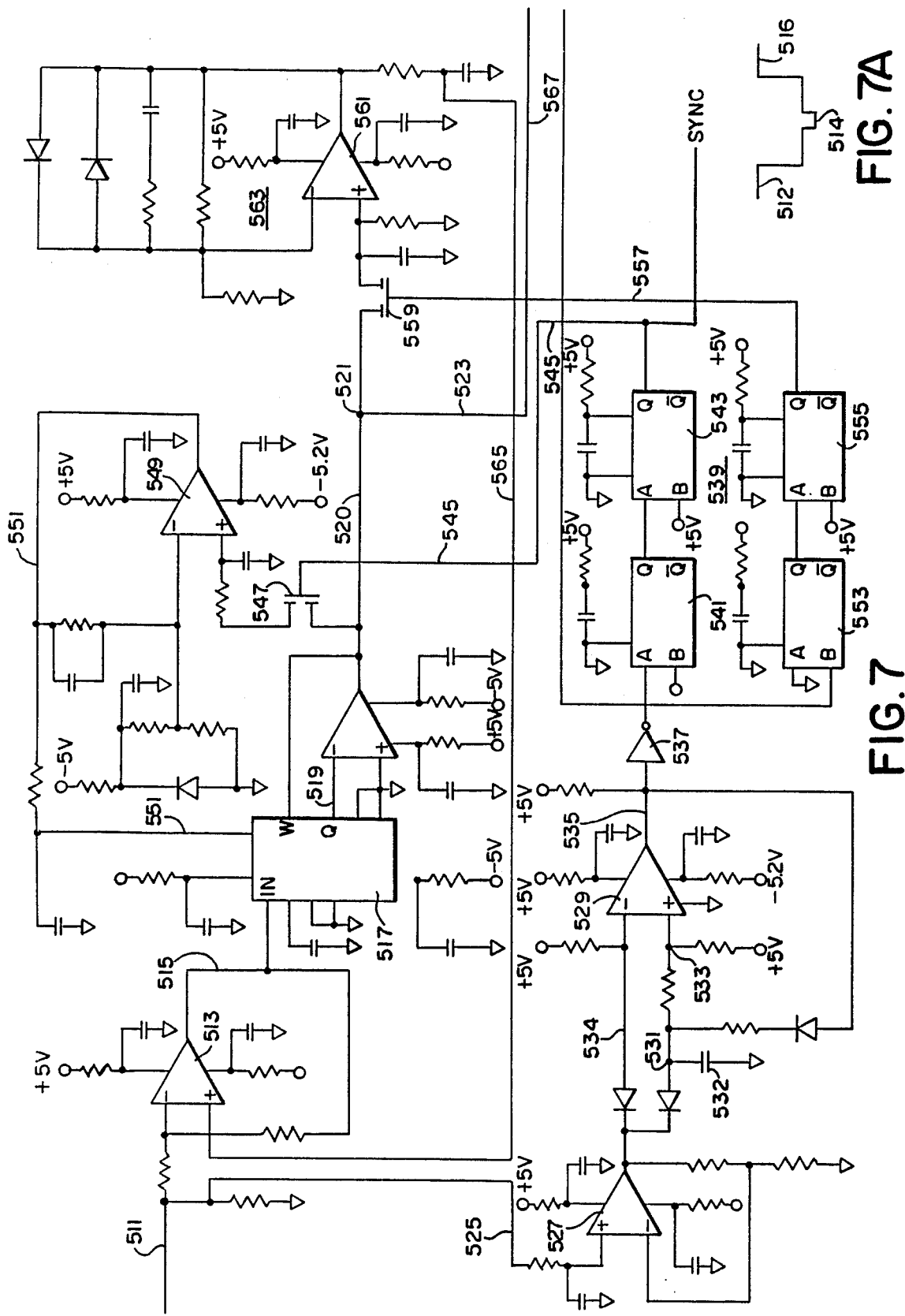
FIGS. 7 and 7A depict the circuitry of the analog input device and a sync signal.

FIG. 7 depicts detailed circuitry of the analog input device 11 shown in FIG. 1. The analog signals come from the TV camera, or some other analog signal source, on lines 511. Without any corrections thereto, the analog signals would pass through the operation amplifier 513, along channel 515 to the multiplier 517. As will be explained below, the signals are amplified at the operation amplifier 513 and multiplied at the multiplier adjustable gain device 517. However, assume for the moment that the signals pass through the multiplier 517, along channel 519, along channel 520 to terminal 521, along channel 523 along channel 567, to the A to D converter 15 of FIG. 1. The A to D converter is the ultimate goal of the signals, however, actually, there are numerous adjustments and corrections made to the analog signals in the analog input circuitry of FIG. 7. Before getting into the details of the circuitry of FIG. 7, it should be understood that the main purpose of the analog input circuitry of FIG. 7 is to provide signals which are in a voltage range that is acceptable to the A to D converter 15 of FIG. 1.

In FIG. 7 it can be noted that the signals pass from the channel 511, along channel 525, to the operation amplifier 527. The signals are amplified (doubled in voltage amplitude) at the operational amplifier 527 and pass to the sync separator device 529. The circuitry of FIG. 7 assumes that the sync signal which is shown in FIG. 7A is reliable both time wise and amplitude wise so that the analog signals in general will be adjusted in accordance with any necessary adjustments that are determined with respect to the sync signals. Note in FIG. 7A that the sync signal has a front porch configuration 512, a peak configuration 514 and a backporch configuration 516. The sync signals (which are part of a train of analog signals) coming from the operation amplifier 527 will be negative as shown in FIG. 7A. By providing a negative sync signal to the terminal 531 and in view of capacitor 532 being connected to ground, the voltage at 531 will be equal to the value of the voltage at 514. Because of the resistor network to +5 volts, the voltage at terminal 533 will be slightly higher. Accordingly only sync signals will be passed to channel 535, because the output of operational amplifier 529 will only occur in response to the positive input at 533. The delay circuitry 539 is included to provide two different sample times, i.e., one sample time occurs during the peak period 514, while the second sample time takes place during the backporch period 516 both shown in FIG. 7A. The upper delay path of the delay circuit 539, is made up of two monostable multivibrators 541 and 543. The monostable multivibrator 541 fires, or gets turned on, in response to the leading edge of the peak portion 514 of the sync signal shown in FIG. 7A. When the monostable multivibrator 541 returns to its reset side the second monostable multivibrator 543 is fired. Accordingly the syn signal from the sync separator 529 is delayed (in a preferred embodiment) approximately 3.5 microseconds. This delayed signal (i.e., the delayed leading edge of the sync signal) becomes the sampling signal and is forwarded on channel 545 to close the switch 547. It becomes apparent then that the analog signals on channel 520 are sampled sometime during the middle of the peak portion 514 of a sync signal included in the chain of analog signals. Since the desired amplitude value of the sync signal is known during that sampling period, then the system can adjust amplitude of the analog signal train if indeed the sampled sync signal does not match the desired value. Therefore all of the analog signals on line 520 will be adjusted accordingly. The sampled sync signal is transmitted to the comparator 549. The network connected to the upper portion of the comparator 549 provides a ½ volts signal to the negative input pin of the comparator 549. If the sampled sync signal (which is applied to the positive input pin of the comparator 549) is different from the ½ volt value then an error signal will be present at the output of the comparator 549. The error signal is passed along channel 551 to the multiplier 517. The video signals on line 515 are multiplied by the factor that is provided in response to the error signal on line 551.

The lower two monostable multivibrators 553 and 555 of the delay circuitry 539 respond to the trailing edge of the peak section 514 shown in FIG. 7A. The two monostable multivibrators 553 and 555 act in the same manner as that described in connection with the monostable multivibrators 541 and 543 and hence there is a delay of about 3.5 microseconds of a trailing edge signal of the peak section 514. Accordingly, a sampling takes place somewhere in the middle of the backporch section 516. The backporch sampled signal is transmitted on channel 557 to close the switch 559. When the switch 559 closes a sample during the backporch signal time is sent to the comparator 561. It should be noted that the circuitry connected to the upper section of the comparator 561 provides a ground signal to the negative input pin of the comparator 561. If the sampled backporch signal is different from ground, an error signal is generated which is applied along channel 565 to the operation amplifier 513 at the beginning of the circuitry of FIG. 7. The error signal applied to the operational amplifier 513 causes the operational amplifier 513 to provide a pedestal signal to the incoming video. Hence the incoming video signals are altered into the desired voltage range to accommodate the A to D converter 15 of FIG. 1. With the foregoing corrections taking place the video signal on line 567 are held in the desired voltage range for use by the A to D converter.

As was mentioned earlier, if the signal which is being transmitted through the circuitry of FIG. 1 has been subjected to subsampling then every other pel has been ignored or dropped. As was also described earlier, and assuming subsampling has taken place (when the signal in the decoder circuitry of FIG. 2 has been restored to an 8 bit per pel form), the decoded signal is subjected to interpolation. The circuitry of FIG. 8 accomplishes the interpolation. In the preferred embodiment in order to accomplish interpolation the idea is to derive three adjacent pels from two adjacent pel values, with the middle pel being the amplitude average of the original two adjacent pels. For instance, consider that the first pel had a value of 10 and its adjacent pel had a value of 14. If those two pels were subjected to interpolation there would be a pel inserted therebetween which would have a value of 12. The foregoing procedure is accomplished by the circuitry of FIG. 8.

In FIG. 8 the 8 bits of the first pel are forwarded over lines 611 to the latch 613. The latch 613 is activated o the positive leading edge of a pel clock signal on line 625. Thus in a first time period latch 613 receives the first pel signals. The leading edge of that clock signal is inverted at inverter 614 to a negative signal and passed to the latch 615. Hence latch 615 does not respond to accept the first pel signals in the first time period. When the trailing edge of the clock signal arrives on line 625 it is inverted in the inverter 614 and activates the latch 615. At the trailing edge time the first pel signals are still available on lines 611 and therefore the trailing edge cause the first pel signals to be transferred to the latch 615. Hence, immediately after the trailing edge of the clock signal, there are first pel signals in both of the latches 613 and 615. The signals from the latches 613 and 615 are always available to the adders 617 and 619. Therefore, as can be gleaned from FIG. 8, the first pel in latch 613 is added to the first pel in latch 615. The outputs from the adders 617 and 619 are always available and accordingly the summation of the pels from the two latches 613 and 615 are available on the lines 621, 623, and 624 to be transmitted to the video output device 49 of FIG. 2.

Note that the adders 617 and 619 constitute one 16 position adder. The adder 617 is the low order adder while the adder 619 is the high order adder. The output signals are shifted one position toward the low order by ignoring the low order position of the adders. The highest order signal on line 624, is the carry signal. Thus the lines 621, 623 and 624 provide an 8 bit summation of the signals in latches 613 and 615 divided by 2. In other words, by shifting the output signals of the adder one position toward the lowest order the pel values in latch 613 and 615 are averaged.

In response to the leading edge of the next pel clock signal on line 625, latch 613 accepts the next adjacent pel. Bear in mind that the first pel is still in latch 615. Immediately upon the receipt of the next adjacent pel into the latch 613, the adders 617 and 619 will add the first pel in latch in 615 with the next adjacent pel in latch 613. Since the information from the pels is immediately available to the adder the output signals on lines 621, 623 and 624 will provide a new pel value which is the average of the first pel value and the next adjacent pel value. The new pel will become the second pel in the train or the inserted pel to effect the interpolation. On the trailing edge of the second pel clock signal, the next adjacent pel on line 611 is placed in latch 615 and thereupon the adders 617 and 619 provide the addition of the next adjacent pel with itself. The average of the two next adjacent pels, of course, is the next adjacent pel value per se and the output on lines 621 623, and 624 becomes the third pel in the chain. The procedure repeats itself and inbetween evevy two adjacent pels in the train (after the signals have been decoded and returned to their 8 bit format) there will be inserted a new pel which is the average of the two adjacent pels.

Figure 9:
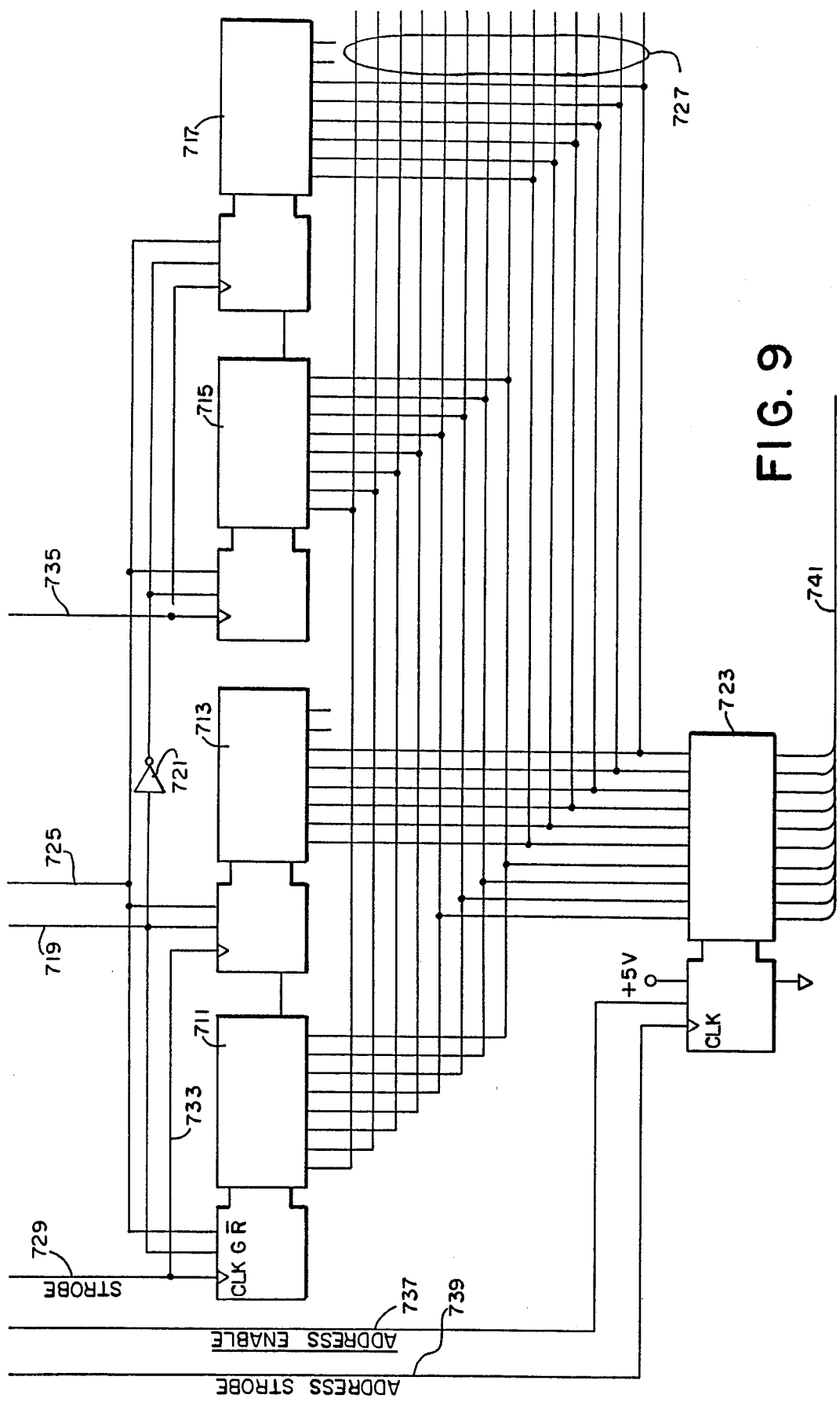
FIG. 9 depicts the circuitry which keeps an account of the addresses for the buffer.

As was mentioned above, the buffer storage device 23 of FIG. 1 maintains an account of the last address in the memory of the buffer from whence information was read and maintains an account of the last address in the memory of the buffer into which information was written. As was also mentioned above the computer device is able to monitor that address information. The circuitry which keeps an account of the addresses and provides the information to the computer is found in FIG. 9. In FIG. 9 there is shown a read counter made up of two counters 711 and 713. Also shown in FIG. 9 is a write counter made up of two counters 715 and 717. Note in FIG. 9 that there is a read/write signal line 719. The read/write signals are alternately positive and negative. When the positive signal portion is on line 719 both the read counter 711 and 713 are conditioned to read out but that positive signal does not affect the write counters 715 and 717 because the inverters 721 inverts the positive signal to a negative signal. Hence the write counter 715 and 717 are not activated by that signal. However, when the negative half of the read/write signal occurs then the read counter is not activated because of the signal inversion but the write counter is conditioned to provide a read out because the negative signal is inverted by inverter 721. Accordingly, alternately the read counters 711 and 713 provide a read out to the flipflops 723 in one time frame and the write counters 715 and 717 provide a read out for the flipflops 723 in a succeeding time frame. It should be noted that the counters can be reset by a clear signal on line 725. When the computer wants to monitor the addresses and make a decision as to whether or not there should be more severe compression or there should be a reduction of the number of lines being compressed, as described earlier, the computer will interrogate the flipflops 723. The flipflops 723 are monitored during the end of the read time period or during the end of the write time period in order to monitor the information which is respectively in the read counter or the write counter. It should also be noted that the lines 727 are connected to the outputs of the read and write counters and those lines provide the actual address signals to the memory part of the buffer.

Now when the system is going to effect a read out, that is, extract information from the buffer memory and pass it to the communication interface 31, there will be a read signal on line 719 and simultaneously therewith the memory of the buffer will have a read enable signal not shown. In response to the read signal on line 719 a read address will be transmitted on lines 727. At the end of that read signal period, there will be a read strobe signal on line 729 which advances the counters 711 and 713. The counter 713 only advances when the counter 711 has been filled and it advances in response to a carry signal being in coincidence with a signal on line 733. In a similar manner, when the system wants to write information into the memory of the buffer there is a write signal on 719 which provides address signals on lines 727 and those address signals are effective if in fact there is a write enable signal applied to the memory of the buffer (such write enable signal not being shown). At the end of the write signal time just described there will be a write strobe signal on line 735 which will advance the counters 715 and 717 so that new available addresses for a subsequent write out will be present. When the computer wants to interrogate the flipflops 723 there is provided an address strobe signal on line 737 which enables the flipflops to accept a read out from either the counters 711 and 713 or from counters 715 and 717. The address signals will sit in the flipflops 723 until the computer generates an address enable signal on line 739 which will cause the flipflops to provide a read out from flipflops 723 onto the lines 741. It should be apparent from the foregoing description that the buffer does keep an account of the last read address and the last write address and from that information the computer can determine whether or not the buffer is loading or whether it is going lean in order to determine whether or not more severe compression is necessary or less compression should be effected.

We claim:

1. A system for variably altering the format of image data signals to enable an encoded transmission thereof while maintaining an acceptable resolution for the output image comprising in combination: data processing means programmed to respond to the value of available empty storage space in a signal storage means and to the rate of which said empty space is lessening or increasing and formed to generate and provide control signals in response thereto; clock signal generating means to provide a plurality of different timing signals connected to said data processing means; analog to digital converter means formed to receive analog signals and convert them into digital signals, said analog to digital converter means connected to said clock signal generating means to receive timing signals therefrom; compression encoding means for compressing digital signals by selectively altering the format of digital signals received thereby, said compression encoding means connected to said analog to digital converter means to receive digital signals therefrom and connected to said data processin means to receive said control signals therefrom; signal storage means to store digital signals, said signal storage means designed to generate status signals from which the available empty storage space can be determined and from which the rate of which said empty storage space is lessening or increasing can be determined; first circuitry means connecting said signal storage means to said data processing means to transmit status signals thereto whereby said data processing means generates and transmits control signals to said compression encoding means to selectively alter the format of digital signals being transmitted through said compression encoding means.

2. A system for variably altering the format of image data signals according to claim 1 wherein said analog to digital converter converts said analog signals into 8 bit coded signals and wherein said compression encoding means compresses said 8-bit coded signals into 2 bit coded signals.

3. A system for variably altering the format of image data signals according to claim 1 wherein said status signals are read address signals and write address signals.

4. A system for variably altering the format of image data signals according to claim 1 wherein said compression encoding means includes means to advance only certain ones of the digital signals in response to control signals from said data processing means whereby a train of said digital signals can be compressed by subsampling.

5. A system for variably altering the format of image data signals according to claim 1 wherein there is further included a signal transmission means to transmit said encoded digital signals.

6. A system for variably altering the format of image data signals according to claim 5 wherein there is further included a decoding loop means which receives said encoded digital signals and decodes them into analog signals which substantially resemble said analog signals received by said analog to digital converter.

7. A system for variably altering the format of image signals according to claim 6 wherein said decoding loop includes an interpolation means to insert signals in a train of digital signals by interpolation if said digital signals have been subjected to compression by subsampling.

8. A system for variably altering the format of image data signals according to claim 1 wherein said analog to digital converter converts said analog signals into 8 bit coded signals and wherein said compression encoding means compresses said 8 bit coded signals into 3 bit coded signals.

9. A system for variably altering the format of image data signals according to claim 2 wherein said compression encoding means includes means to further compress said 3 bit coded signals according to a variable length code.

10. A system for variably altering the format of image data signals according to claim 9 wherein said compression encoding means includes formatting means which insert a tag prior to a train of digital signals which have been compressed into a 3 bit code and which are further compressed in accordance with a variable length code, which tag indicates to what forms of compression said train of digital signals has been subjected.

11. A system for variably altering the format of image data signals according to claim 10 wherein the number of lines compressed will be reduced in response to said available empty storage space becoming too large.

12. A system for variably altering the format of image data signals to enable an encoded transmission thereof while maintaining an acceptable resolution for the output image comprising in combination: data processing means programmed to respond to the value of available empty space in a signal storage means and to the rate at which said empty space is lessening or increasing and formed to generate and provide control signals; clock signal generating means to provide a plurality of different timing signals connected to said data processing means; analog to digital converter means formed to receive analog signals and convert them into digital signals, said analog to digital converter means connected to said clock signal generating means to receive timing signals therefrom; differential pulse code modulation means connected to said analog to digital converter means, to said data processing means, and to said clock signal generating means to transform said digital signals received from said analog to digital converter means into a 3 digit code; entropy encoder means connected to said clock signal generating means, to said data processing means and to said differential pulse code modulation means to receive said 3 digit code signals and transform them into a further compressed set of signals in accordance with a variable length code; formatting means connected to said clock signal generating means, to said data processing means and to said entropy encoder means to receive a train of data signals therefrom which have been compressed at least twice and to insert a tag to precede said train of signals which tag indicates to what forms of compression said train of signals have been subjected; signal storage means connected to said clock signal generating means, to said data processing means and to said formatting means to receive data signals therefrom and store said data signals, said signal storage means including means to record the last read address employed and the last write address employed and mean to transmit said last read address and said last write address to said data processin means whereby said data processing means can determine the amount of empty space in said signal storage means and the rate at which said signal storage is being loaded or is being emptied to generate control signals for compressing more video lines or reducing the number of video lines being compressed; and digitized signal transmitting means connected to transmit said compressed digitized signals to a receiving means.

* * * * *

UNITED STATES PATENT AND TRADEMARK OFFICE
CERTIFICATE OF CORRECTION

PATENT NO. : 4,729,020
DATED : MARCH 1, 1988
INVENTOR(S) : RICHARD A. SCHAPHORST and NEIL RANDALL It is certified that error appears in the above-identified patent and that said Letters Patent is hereby corrected as shown below:

Column 7,

Line 39, after "communicatio" should be --communication--.

Column 11,

Line 46, "respons" should be --response--.

Column 13,

Line 11, "syn" should be --sync--.

Column 18,

Line 32, "mean" should be --means--;

Line 33, "processin" should be --processing--.

Signed and Sealed this

Twelfth Day of July, 1988

*Attest:*

DONALD J. QUIGG

*Attesting Officer*　　　　*Commissioner of Patents and Trademarks*